INVENTORS
YASUO FUKUYAMA
YOSUKE OKADA

United States Patent Office 3,673,025
Patented June 27, 1972

3,673,025
METHOD OF MAKING A POLYURETHANE RUBBER COVERED ROLL
Yasuo Fukuyama and Yosuke Okada, Hirakata-shi, Japan, assignors to Yamauchi Rubber Industry Co., Ltd., Osaka, Japan
Original application Oct. 23, 1968, Ser. No. 769,844, now Patent No. 3,490,119. Divided and this application Aug. 11, 1969, Ser. No. 862,127
Int. Cl. B65h 81/00
U.S. Cl. 156—154
5 Claims

ABSTRACT OF THE DISCLOSURE

This polyurethane rubber covered roll consists of a metal core fixed by winding with a fiber previously impregnated with thermosetting resin solution to form a substratum and then a polyurethane rubber layer is cast molded on the periphery of said substratum.

CROSS REFERENCE TO A RELATED APPLICATION

This application is a division of our co-pending application, Ser. No. 769,844, now Pat. No. 3,490,119, filed on Oct. 23, 1968.

BACKGROUND OF THE INVENTION (a) Field of the invention

The present invention relates to a polyurethane rubber covered roll for use in various industries such as paper, textile, iron and steel, etc. and more particularly to a polyurethane rubber covered roll having a metal roll core fixed by winding with a fiber previously impregnated with thermosetting resin solution to form a substratum and said substratum, before or after the hardening of said resin solution, is fixed by cast-molding with a polyurethane rubber layer with or without applying a bonding agent to the surface.

(b) Description of the prior art

The conventional roll cores, especially those large in size which have almost exclusively been made of cast iron because of the lower cost, are known to have drawbacks such as the brittleness of the material and the presence of the pinholes on the surface liable to effect foaming in the layer of the bonding agent thereby reducing the bonding strength between the roll and the polyurethane rubber layer.

Other than said cast iron roll core, stainless steel or bronze or aluminum roll cores are also used. These roll cores are higher in strength and more excellent than cast iron core because they have no pinholes on the surface. But, because of their high stability against chemicals, they tend to show a poor bonding result with the polyurethane rubber layer. Polyurethane rubber is high in strength and also in resistance to wear and tear. The strength is usually stronger than the bonding strength between the roll core, made of cast iron, stainless steel, bronze, aluminum, etc., and polyurethane rubber, as a result when the conventional polyurethane rubber covered roll using said metal cores is operated under heavy load and at high revolution rate the polyurethane rubber layer tends to strip off the roll core before the polyurethane rubber layer breaks.

To eliminate the causes of these drawbacks the following two attempts were made:

(1) To use a roll core having coarser surface.
(2) To form an ebonite layer on the roll core.

The above method (1) ended in failure because the coarse surface was liable to effect foaming in the layer of bonding agent and caused stripping of the layer.

The method (2) also ended in failure because on casting polyurethane rubber the ebonite layer it was found extremely difficult to use cast-molding to a polyurethane rubber layer corresponding in strength to that of ebonite and the great difference in the strength between the two makes it impracticable to bond an ebonite layer with a polyurethane rubber layer without creating the risk of the polyurethane rubber layer stripping off in operation under a heavy load and at a high revolution rate.

As stated in the foregoing, the above two methods (1) and (2) were not able to obtain successful results.

SUMMARY OF THE INVENTION

An object of this invention is to overcome the drawbacks as stated in the foregoing inherent with the conventional polyurethane rubber covered roll and to offer an improved one made by fixing by winding around the roll core provided with grooves on the periphery thereof a fiber previously impregnated with thermosetting resin solution. The surface of the substratum thus obtained, before or after the hardening of said resin solution, is provided with a polyurethane rubber layer formed by cast molding, with or without using bonding agent, and the product thus obtained is free from such trouble as stripping of the layer from the roll core.

Another object of this invention is to provide an improved polyurethane ruber covered roll free from stripping trouble during operation under heavy load and at a high revolution rate by impregnating the fiber filaments such as glass fiber, nylon, polyester, etc. with a solution of a thermosetting resin like epoxy resin, polyester resin, diallyl phthalate, etc. The fiber impregnated with the thermosetting resin solution is fixed by winding to the surface of the roll core in a proper thickness to form a layer of the fiber impregnated with thermosetting resin solution. The surface of said fiber layer, before or after the curing of said layer, is covered with a polyurethane rubber layer formed by cast-molding with or without using a bonding agent, and the three elements, that is the roll core, the fiber layer, and the polyurethane rubber layer, are incorporated in a solid body by a perfect bonding.

Another object of this invention is to provide an improved polyurethane rubber covered roll in which a cast iron roll core is used but the brittleness of said cast iron core is remedied by the structural strength of the roll reinforced by the perfect bonding of the fiber layer to the core owing to the compressive force used when winding and also the stronger bonding of fiber filaments among themselves because of the thermosetting resin impregnated in them and the growth of foam between the core and the fiber layer is entirely prevented.

Still another object of this invention is to provide an improved polyurethane rubber covered roll in which the roll core can be made of metals other than cast iron, for example, stainless steel, aluminium, bronze, which are known to be not completely satisfactory to the action of the bonding agent. Nevertheless the polyurethane rubber layer is firmly formed on the top of the substratum of fibers impregnated with thermosetting resins and thereby eliminates the cause of stripping of the resin layer.

A further object of this invention is to provide a method by which a polyurethane rubber covered roll can be made at a reduced cost by reducing the thickness of polyurethane rubber, which is relatively high in cost, by using the fiber layer, which is lower in cost, as well by as strengthening the bond between the polyurethane rubber layer and the fiber layer by using thermosetting resin impregnated in the fiber.

DETAILED DESCRIPTION OF THE INVENTION

The present invention is to provide an improved polyurethane rubber covered roll for use in various industries such as paper, textile, iron and steel, etc.

Figure 1:
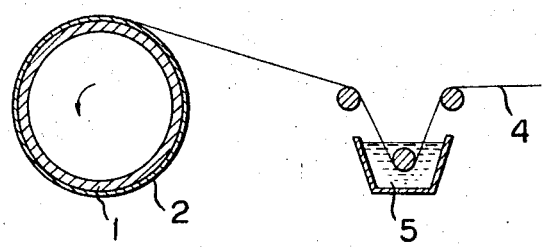
FIG. 1 is a sketch of cross-section of the roll etc. showing how the fiber is fixed by winding around the roll core.
Figure 2:
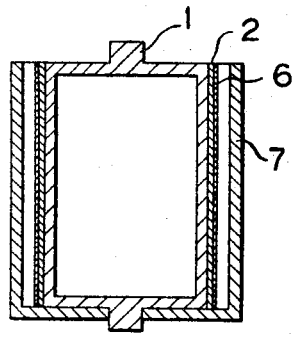
FIG. 2 is a vertical section of the roll and casting mold.
Figure 3:
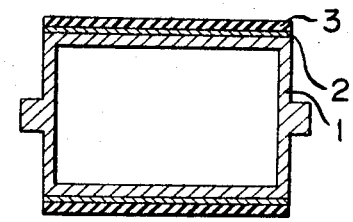
FIG. 3 is a longitudinal section of the polyurethane rubber covered roll according to this invention.

In FIG. 1, the roll core 1, which is provided with narrowly spaced grooves on the periphery thereof, is made of the metals such as cast iron, stainless steel, bronze, aluminium, etc. Said roll core 1 rotates to take up the winding fiber 4, for example, glass fiber, nylon, polyester, etc., with the filaments being fully impregnated in advance with thermosetting resin, such as epoxy, polyester, diallylphthalate, etc. by dipping into a solution 5 of such resins. Thereby a fiber layer 2 in desired thickness is formed around the roll core 1. This roll having said fiber layer 2, before or after the hardening of the thermosetting resin and with or without giving to the surface a proper trimming and also applying or not applying a bonding agent to the surface, is placed in the casting mold 7 as shown in FIG. 2 and then polyurethane resin is poured into the mold so that a polyurethane rubber layer 3 is formed around the roll. After hardening of the polyurethane rubber, the surface of the roll is trimmed by abrasion.

In the following, further explanation will be made concerning how this invention rubber covered roll is made with reference to the several examples given below.

EXAMPLE 1

In this example, a polyurethane rubber covered roll was made of the following materials:

A cast iron roll core:
2 meters long and 600 mm. in diameter (generally the proportion length/diameter <5 is recommended.) Distortion test $1 \times 10^{-6}$ maximum. Groove cut in the periphery 2.5 mm. apart.

Fiber: Glass roving made of $9\mu$ glass fiber previously processed by Volan treatment.

Thermosetting resin: Epoxy resin (solution of the mixture of Epikote 815 of Shell Oil Co. 100 parts and triethylene tetramine 10 parts.)

As shown in FIG. 1, the roll core 1 takes up by winding the fiber 4 impregnated in epoxy resin in the weight ratio of two parts fiber to one part resin, while applying a tension 10 kg. until the fiber layer 2 reaches 4 mm., in thickness. Thereupon the roll newly provided with the fiber layer was placed in the casting mold designed to give when a polyurethane rubber layer 25 mm. thick on the fiber layer. Into the interspace between the mold and the roll, a molding solution of polyurethane elastomer, a defoaming mixture of 100 parts of Adiprene L–100 made by Dupont and 12 parts of (4,4′-methylenebis (2-chloroaniline)), is poured. And after the casting was hardened with drying process for 10 hours at 100° C., it was cooled down to room temperature and released from the mold and the surface was trimmed by abrasion until the final product roll had a polyurethane rubber layer 3, 20 mm. in thickness.

The product polyurethane rubber covered roll was found capable of enduring operation under a load 240 kg./cm. and at a rate of 100 r.p.m. under room temperature. The standard sample of a polyurethane rubber covered roll having a polyurethane rubber layer directly attached to the roll core by an isocyanate type bonding agent without a resin-impregnated fiber layer showed stripping of the rubber layer when operated under the load 160 kg./cm., all other conditions being the same as the above.

EXAMPLE 2

In this example, a polyurethane rubber covered roll was made of the following materials:

A cast iron roll core:
2 meters long and 300 mm. in diameter.
Flexure test in the maximum range from $1 \times 10^{-6}$ to $1 \times 10^{-4}$.
Screw thread cut in the periphery in pitch from 1 to 6 mm.

Fiber: Glass roving made by the Nitto Bo, Ltd. made of glass fiber, GYR–60–FWE.

Thermosetting resin: Epoxy resin, mix solution of 100 parts of Araldite GY–250, 80 parts of acid anhydride hardener HHPA, and 2 parts of accelerator, tertiary amine BDMA.

The cast iron roll processed as described above, takes up by winding the fiber 4 impregnated in the resin 5 in the range from 40:60 to 80:20 in weight ratio slantways at 50° C. and reversing the direction alternately layer after layer while applying a tension of 10 kg. along the axis. The winding continued until the fiber layer reached from 2 to 5 mm. in thickness. Then the fiber layer of the roll was hardened with a heating process for 4 hours at 100° C. for 5 hours at 150° C. for 9 hours in total and the surface of the fiber layer 2 was trimmed by a lathe to give a smooth surface. The semi-product roll thus obtained was placed upright, there was applied on the surface an isocyanate-based adhesive 6. The roll was put into the casting mold and the interspace was filled with polyurethane elastomer in the same way as described in Example 1 and was hardened with heating process for 5 hours at 100° C. and after giving the finishing processing as described in Example 1, the finished polyurethane rubber covered roll was obtained. The product polyurethane rubber roll was found to be free from any cracks liable to occur in the resin-impregnated fiber layer owing to the distortion of the roll core.

EXAMPLE 3

In this example, the polyurethane rubber covered roll was made of the following materials:

Aluminum roll core: 2 meters long, 40 mm. thick, and 600 mm. in outer diameter.
Fiber: Polyethylene terephthalate roving, 20 denier.
Thermosetting resin: Epoxy resin, as used in Example 1.

The fiber impregnated with said resin in the weight ratio one part fiber to one part resin was taken up by winding by the aluminum roll core while applying a tension of 10 kg. to the periphery. The winding was continued until the fiber layer reached 3 mm. in thickness and the resin-impregnated fiber layer was hardened by leaving it to stand for 2 hours at room temperature there then followed the cast molding process as explained in Example 2 to produce the polyurethane rubber roll. The product polyurethane rubber covered roll was found to be free from any stripping of the rubber layer from the aluminum roll core.

EXAMPLE 4

In the present example, the polyurethane rubber covered roll was composed of the following materials:

Stainless steel or bronze roll core: Suction roll for use in a paper making machine, 3.5 meters long, 30 mm. thick, and 500 mm. in outer diameter, provided with 90,000 holes, each 3 mm. in diameter, perforated all over, and grooves, 1 mm. deep, cut 3 mm. apart.

Fiber: Glass cross tape, EGL–9230–65, made of non-alkali type glass fiber, 0.23 mm. thick and 65 mm. wide, made by the Nitto Bo and glass roving, GYR–60–FWE, made by the Nitto Bo.

Thermosetting resin: Epoxy resin (solution of the mixture of 100 parts of Araldite GY252, and 23 parts of Araldite HY974).

The aforesaid two types of fiber, namely glass cross tape 4' and glass roving 4" previously impregnated in the resin in the range from 40:60 to 80:20 are alternately taken up by winding by the core roll 1 while applying a tension 10 kg. until each layer reached 1 mm. in thickness. Then the roll was left to stand for 6 hours at room temperature to harden.

Figure 4:
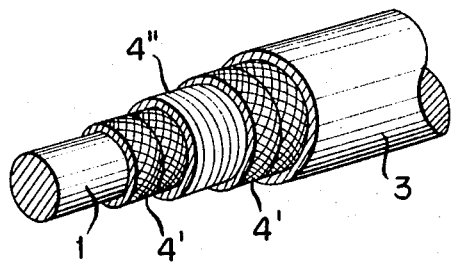
FIG. 4 shows another embodiment of the invention roll partly cut away.

Then the surface of the fiber layer 2 was trimmed smooth by abrasion and the cast molding was performed as explained in Example 2 and a polyurethane rubber covered roll was obtained (see FIG. 4).

By this example, it was found that a suction roll for a paper making machine perforated with a plurality of small holes is capable to be used for a core roll for making polyurethane rubber roll eliminating the need of new core roll specially for the purpose.

What is claimed is:

1. A method of producing a polyurethane rubber-covered roll, which comprises, rotating a stiff metal roll core having circumferentially extending grooves on the periphery thereof;

impregnating elongated fiber with a thermosetting resin and then tightly winding said impregnated fiber circumferentially around said rotating core so that said fiber is received in said grooves to form an external fiber layer of uniform thickness on said core;

then placing said core having said external fiber layer exposed on the exterior thereof into a cylindrical mold cavity, so that there is an annular space within said mold cavity surrounding said external fiber layer, the inner side of said space being bounded by said external fiber layer;

casting into said annular space a fluent polyurethane molding composition and then hardening said composition and then hardening said composition to obtain a polyurethane rubber-covered roll in which the polyurethane rubber outer layer is bonded directly to said external fiber layer on said core;

removing said polyurethane rubber-covered roll from said mold and then trimming by abrasion the periphery of said polyurethane rubber layer to obtain the finished roll.

2. A method according to claim 1, in which the fiber is wound so that the convolutions thereof are substantially parallel to each other and extend substantially perpendicular to the axis of said core.

3. A method according to claim 1, in which the fiber is wound in a helical fashion on the core, there being a plurality of layers of fibers on the core with the helix angle of the fiber in each layer being reversed with respect to the helix angle of the fibers in the adjacent layers.

4. A method according to claim 1, including the step of applying a bonding agent to said fiber layer before casting said polyurethane rubber layer thereon.

5. A method according to claim 1, including the step of applying tension to said fiber simultaneously with the winding thereof on said core.

References Cited
UNITED STATES PATENTS

| | | | |
|---|---|---|---|
| 1,640,216 | 8/1927 | Rathers | 156—245 |
| 1,659,371 | 2/1928 | Merrill | 156—172 |
| 2,263,285 | 11/1941 | Bolog | 156—172 |
| 3,112,897 | 12/1963 | Eshbaugh et al. | 156—169 |
| 3,293,728 | 12/1966 | Hill | 29—132 |
| 3,364,051 | 1/1968 | Broderick | 156—187 |
| 3,447,221 | 6/1969 | Odiorne | 29—132 |

CARL D. QUARFORTH, Primary Examiner

E. E. LEHMANN, Assistant Examiner

U.S. Cl. X.R.

29—132; 156—172, 245, 280, 293